United States Patent
Wang et al.

(10) Patent No.: US 11,514,555 B2
(45) Date of Patent: Nov. 29, 2022

(54) POINT CLOUD DENOISING METHOD BASED ON DEEP LEARNING FOR AIRCRAFT PART

(71) Applicant: NANJING UNIVERSITY OF AERONAUTICS AND ASTRONAUTICS, Jiangsu (CN)

(72) Inventors: Jun Wang, Jiangsu (CN); Dening Lu, Jiangsu (CN); Dawei Li, Jiangsu (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 21 days.

(21) Appl. No.: 17/169,534

(22) Filed: Feb. 7, 2021

(65) Prior Publication Data
US 2021/0327032 A1 Oct. 21, 2021

(30) Foreign Application Priority Data
Apr. 16, 2020 (CN) ........................ CN202010299670

(51) Int. Cl.
*G06T 5/00* (2006.01)
*G01B 11/24* (2006.01)
(Continued)

(52) U.S. Cl.
CPC .............. *G06T 5/002* (2013.01); *G01B 11/24* (2013.01); *G06N 3/04* (2013.01); *G06N 3/084* (2013.01);
(Continued)

(58) Field of Classification Search
CPC ........... G06T 5/002; G06T 2207/10028; G06T 2207/20081; G06T 2207/20084; G01B 11/24; G06N 3/04; G06N 3/084
(Continued)

(56) References Cited

U.S. PATENT DOCUMENTS

2020/0115066 A1* 4/2020 De Munck ............. G06N 3/084

FOREIGN PATENT DOCUMENTS

| CN | 110346808 A | 10/2019 |
| CN | 110533603 A | 12/2019 |
| CN | 110930334 A | 3/2020 |

OTHER PUBLICATIONS

Alexandre Boulch and Renaud Marlet; Deep Learning for Robust Normal Estimation in Unstructured Point Clouds; Dec. 31, 2016; Eurographics Symposium on Geometry Processing 2016; ONERA—The French Aerospace Lab, F-91761 Palaiseau, France.
(Continued)

*Primary Examiner* — Aditya S Bhat

(57) ABSTRACT

The present disclosure provides a point cloud denoising method based on deep learning for an aircraft part, in which different degrees of Gaussian noise are added based on a theoretical data model of the aircraft part, a heightmap for each point in the theoretical data model is generated, and a deep learning training set is constructed. A deep learning network is trained based on the constructed deep learning training set, to obtain a deep learning network model. A real aircraft part is scanned via a laser scanner to obtain measured point cloud data. The normal information of the measured point cloud is predicted based on the trained deep learning network model. Based on the predicted normal information, a position of each point in the measured point cloud data is further updated, thereby completing denoising of the measured point cloud data.

3 Claims, 3 Drawing Sheets

(51) Int. Cl.
*G06N 3/04* (2006.01)
*G06N 3/08* (2006.01)

(52) U.S. Cl.
CPC ............... *G06T 2207/10028* (2013.01); *G06T 2207/20081* (2013.01); *G06T 2207/20084* (2013.01)

(58) Field of Classification Search
USPC ........................................................ 702/167
See application file for complete search history.

(56) References Cited

OTHER PUBLICATIONS

Wang Xingce, Cai Jianping, Wu Zhongke and Zhou Mingquan; Normal Estimation and Normal Orientation for Point Cloud Model Based on improved Local Surface Fitting; Apr. 30, 2015; College of Information Science and Technology, Beijing Normal University, Beijing 100875, abstract only.

* cited by examiner

POINT CLOUD DENOISING METHOD BASED ON DEEP LEARNING FOR AIRCRAFT PART

CROSS-REFERENCE TO RELATED APPLICATIONS

This application claims the benefit of priority from Chinese Patent Application No. 202010299670.3, filed on Apr. 16, 2020. The content of the aforementioned application, including any intervening amendments thereto, is incorporated herein by reference in its entirety.

TECHNICAL FIELD

The present application relates to aviation detection, and more particularly to a point cloud denoising method based on deep learning for an aircraft part for an aircraft part.

BACKGROUND

In recent years, with the continuous improvement of domestic aviation research projects in technical combat indicators such as flight speed, stealth, and maneuverability, aircraft itself tends to has a structure with integration, light weight, compactness and precision characteristics. Aircraft structural parts with complex structures and profile features have begun to be widely adopted. The accuracy requirements of aviation structural parts are also increasing, and the requirements for assembly are gradually increasing, which makes the control and inspection of the manufacturing and processing quality of aircraft parts become particularly important. At the same time, as the operation time of aircraft increases, the wear and deformation of various parts will greatly affect the performance of the aircraft, and even threaten the safety of people's lives and property. Through the inspection of parts and components, the hidden dangers can be found in time to ensure the safety and healthy operation of the aircraft.

Currently, the aircraft parts are mainly measured by traditional measurement methods, such as manual measurement, 3D coordinate measuring machine (CMM) method, etc. Due to the complex shapes and diverse structures of aircraft parts, the traditional measurement methods often fail to meet the accuracy requirements, and possess a low efficiency, which cannot meet the measurement requirements of current aircraft parts.

Due to the advantages of real-time capability, high precision, and non-destructive testing, 3D laser scanning technology has become more and more widely adopted in the aviation field. The use of 3D laser scanning technology to measure and analyze aircraft parts is a trend of high-precision measurement in the aviation field. However, the acquired 3D point cloud often has certain noises owing to the factors such as measurement environment. At present, the processing of 3D point cloud noise for aircraft parts is still in its infancy, which cannot meet the high efficiency and high accuracy requirements of the aviation industry.

SUMMARY

An object of the present disclosure is to provide a point cloud denoising method based on deep learning for an aircraft part, to solve the problems that the existing technology cannot accurately and efficiently denoise the point cloud of aircraft parts.

To achieve the above-mentioned object, the present disclosure provides a point cloud denoising method based on deep learning for an aircraft part, comprising:

S1) based on a theoretical data model of the aircraft part, adding different degrees of Gaussian noise; generating a heightmap for each of points in the theoretical data model; and constructing a deep learning training set;

S2) based on the deep learning training set constructed in S1, training a deep learning network to obtain a deep learning network model;

S3) scanning a real aircraft part via a laser scanner to obtain measured point cloud data; and predicting normal information of the measured point cloud based on the deep learning network model trained in S2; and S4) based on the normal information predicted in S3, further updating a position of each of points in the measured point cloud data, thereby completing denoising of the measured point cloud data.

In an embodiment, a process of generating the heightmap for each of points in the theoretical data model in S1 comprises:

S11) presetting a point $p_i$ in point cloud data from the theoretical data model; and constructing a local neighborhood of the point by using a recurrent neural network;

S12) calculating a covariance matrix $C_{pi}$ according to a formula (1) as:

$$C_{pi} = \frac{1}{|\Psi|} \sum_{p_j \in \Psi} (p_i - p_j)(p_i - p_j)^T; \quad (1)$$

wherein $p_i$ is the point in the point cloud data; $p_i=(x_i, y_i, z_i)$; $(x_i, y_i, z_i)$ is a coordinate of the point $p_i$; $p_j$ is a point in the local neighborhood; $\Psi$ is the local neighborhood of the point $p_i$; and $|\Psi|$ is the number of points in the local neighborhood;

S13) respectively defining three eigenvalues and three eigenvectors of the covariance matrix $C_{pi}$ as $\lambda_1, \lambda_2, \lambda_3$ and $u_1, u_2, u_3$, wherein $\lambda_1 \geq \lambda_2 \geq \lambda_3$, and $u_3=(R, S, T)$;

S14) taking the vector $u_3$ as a normal vector of a projection plane, and constructing the projection plane P according to a formula (2) as:

$$R(x-x_i)+S(y-y_i)+T(z-z_i)=0 \quad (2);$$

wherein (x, y, z) is a coordinate of a point on the projection plane P; and $(x_i, y_i, z_i)$ is the coordinate of the point $p_i$; and S15) based on the projection plane P constructed in S14, all points in the local neighborhood are projected to the projection plane P along the vector $u_3$ to obtain a heightmap of the point $p_i$.

In an embodiment, a process of training the deep learning network to obtain the deep learning network model comprises:

S21) selecting ResNet18 as a deep learning network, and constructing a loss function for the deep learning network as:

$$Loss = \sum_{p_i \in Q} \|n_{pi} - \tilde{n}_{pi}\|^2; \quad (3)$$

wherein $p_i$ is a point in the point cloud data; Q is a point set comprising all points in the deep learning training set; $n_{pi}$ is a normal of the point $p_i$ predicted by the deep learning network; and ñpi is a theoretical normal of the point $p_i$; and S22) inputting the heightmap generated in S1 into the ResNet18 network; updating a weight of the ResNet18 network using a stochastic gradient descent method and a backpropagation algorithm; stopping training until a network loss value area converges, thereby obtaining the deep learning network model.

In an embodiment, in S22, an initial learning rate is 0.001, and a preset maximum number of iterative training is 200.

In an embodiment, S3 further comprises:

S31) presetting a point $p_m$ in the measured point cloud data, and constructing a local neighborhood of the point by using a recurrent neural network;

S32) calculating a covariance matrix $C_{pm}$ according to a formula (4) as:

$$C_{pm} = \frac{1}{|\Gamma|} \sum_{p_n \in \Gamma} (p_m - p_n)(p_m - p_n)^T; \qquad (4)$$

wherein $p_m$ is the point in the measured point cloud data; $p_n$ is a point in the local neighborhood; $\Gamma$ is a local neighborhood of $p_m$; and $|\Gamma|$ is the number of points in the local neighborhood;

S33) defining three eigenvalues and three eigenvectors of the covariance matrix $C_{pm}$ as $\lambda'_1$, $\lambda'_2$, $\lambda'_3$ and $u'_1$, $u'_2$, $u'_3$, respectively, wherein $\lambda'_1 \geq \lambda'_2 \geq \lambda'_3$, and $u'_3 = (R', S', T')$;

S34) taking the vector $u'_3$ as a normal vector of a projection plane, and constructing the projection plane P' according to a formula (2) as:

$$R'(x'-x'_i) + S'(y'-y'_i) + T'(z'-z'_i) = 0 \qquad (5);$$

wherein (x', y', z') is a coordinate of a point on the projection plane P'; and $(x_i, y_i, z_i)$ is a coordinate of $p_i$;

S35) based on the projection plane P' constructed in S34, projecting all points in the local neighborhood to the projection plane P' along the vector $u'_3$ to obtain a heightmap of $p_m$; and S36) inputting the heightmap generated in S35 into the deep learning network model obtained in S2, to obtain a normal vector of the point $p_m$.

In an embodiment, the position of each of the points in the measured point cloud data is updated according to a formula (6) as:

$$\tilde{p}_m = p_m + \alpha_m \sum_{p_n \in \Gamma} (p_m - p_n)(n_n^T n_n + n_m^T n_m); \qquad (6)$$

wherein $p_m$ is a point in the measured point cloud data; is a point in the local neighborhood; $\alpha_m$ is a weight parameter; $\Gamma$ is a local neighborhood of $p_m$; $n_n$ is a normal vector of $p_n$; and $n_m$ is a normal vector of $p_m$.

Compared to the prior art, the present invention has the following beneficial effects.

The point cloud denoising method based on deep learning for an aircraft part provided in the present invention can accurately complete the denoising of the measured point cloud data of the aircraft parts, while maintaining the structural characteristics of the aircraft parts, to solve the problems of low accuracy and low efficiency in traditional measurement methods, thereby ensuring efficiency and accuracy in subsequent detection and analysis of the aircraft part structure.

DETAILED DESCRIPTION OF EMBODIMENTS

The present disclosure will be further described below with reference to the accompanying drawings and embodiments.

Figure 1:
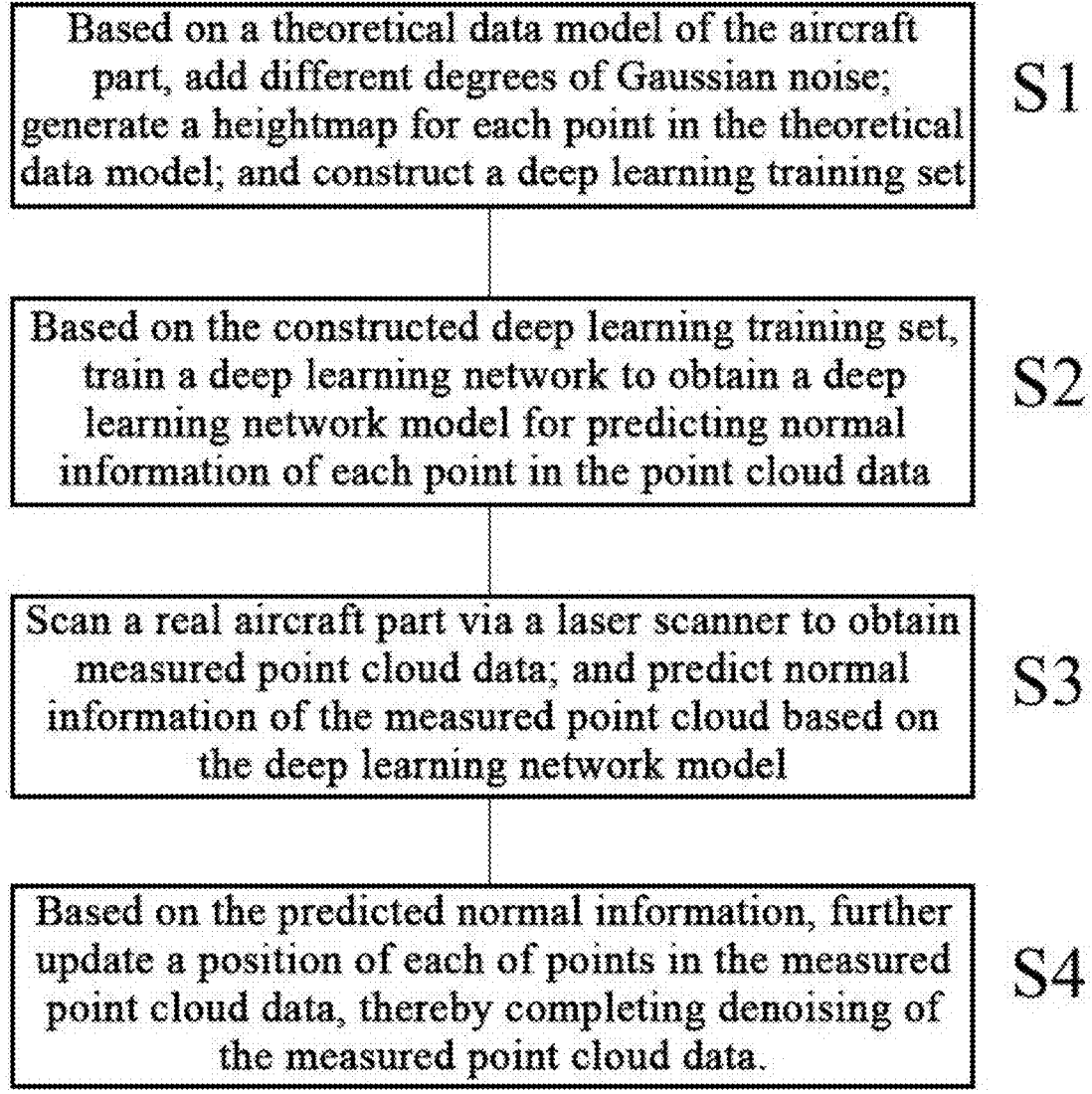
FIG. 1 is a flowchart of a point cloud denoising method based on deep learning for an aircraft part according to an embodiment of the present disclosure.
Figure 2:
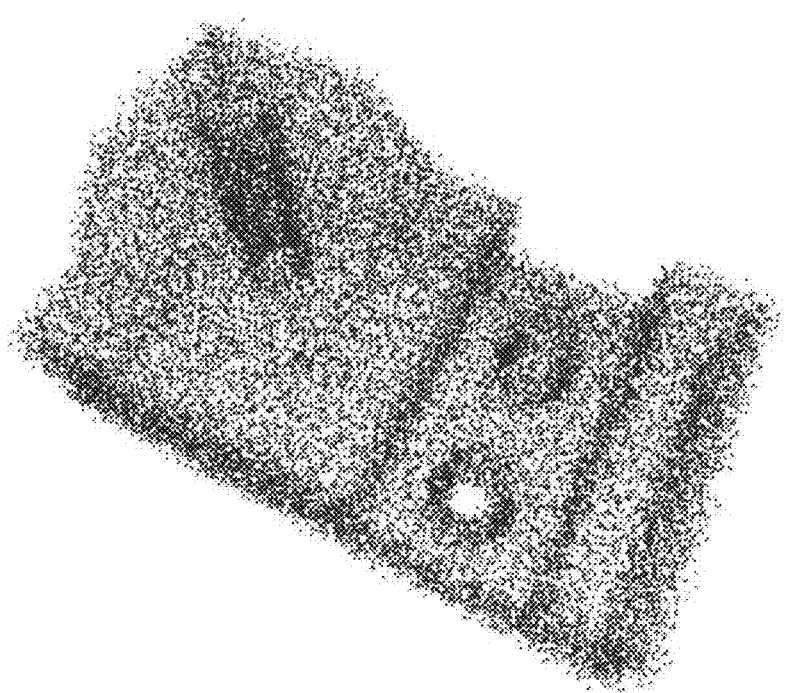
FIG. 2 is a diagram showing original measured data of the aircraft part according to an embodiment of the present disclosure.

Referring to FIG. 1, the point cloud denoising method based on deep learning for an aircraft part provided in the embodiment can be directly applied to scanning data processing devices in various aircraft parts, and the method can be realized by writing a corresponding program in a controller of the scanning data processing device in the specific implementation. FIG. 2 shows a scanning device of the aircraft part and the acquired 3D point cloud data. The acquired 3D point cloud data has problems such as noise interference, which has a great impact on the detection and analysis of the aircraft part. Therefore, the embodiment provides a point cloud denoising method based on deep learning for an aircraft part, including the following steps.

S1) Based on a theoretical data model of the aircraft part, different degrees of Gaussian noise are added. A heightmap for each point in the theoretical data model is generated. And a deep learning training set is constructed. In the embodiment, the step that the heightmap for each point in the theoretical data model is generated includes the following steps.

S11) A point $p_i$ in the point cloud data is given from the theoretical data model. And a local neighborhood of the point is constructed by using a recurrent neural network. Preferably, the neighborhood radius is specifically 5 times the length of an average distance of the point cloud model.

S12) A covariance matrix $C_P$, is calculated according to a formula (13) as follows:

$$C_{pi} = \frac{1}{|\Psi|} \sum_{p_j \in \Psi} (p_i - p_j)(p_i - p_j)^T; \qquad (13)$$

where $p_i$ is the point in the point cloud data; $p_j = (x_j, y_j, z_j)$, $(x_j, y_j, z_j)$ is a coordinate of $p_j$; $p_j$ is a point in the local neighborhood; $\Psi$ is a local neighborhood of $p_j$; and $|\Psi|$ is the number of points in the local neighborhood;

S13) Three eigenvalues and three eigenvectors of the covariance matrix $C_{pi}$ are respectively defined as $\lambda_1$, $\lambda_2$, $\lambda_3$ and $u_1$, $u_2$, $u_3$, where $\lambda_1 \geq \lambda_2 \geq \lambda_3$, and $u_3 = (R, S, T)$.

S14) The vector $u_3$ is taken as a normal vector of a projection plane, and the projection plane P is constructed according to a formula (14) as:

$$R(x-x_i) + S(y-y_i) + T(z-z_i) = 0 \qquad (14);$$

where (x, y, z) is a coordinate of a point on the projection plane P; and $(x_i, y_i, z_i)$ is the coordinate of $p_i$.

Figure 3:
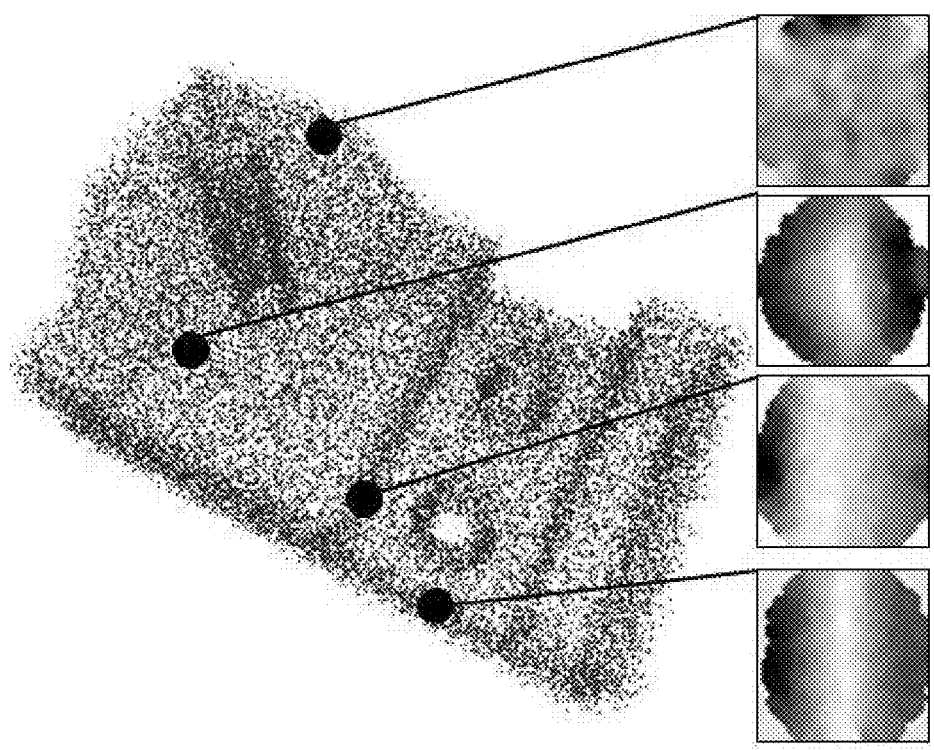
FIG. 3 shows a heightmap of a point cloud of the aircraft part according to an embodiment of the present disclosure.

S15) Based on the constructed projection plane P, all points in the local neighborhood are projected to the projection plane P along the vector $u_3$ to obtain a heightmap of $p_i$, in which a resolution thereof is set to 48×48, as shown in FIG. 3.

S2) Based on the deep learning training set constructed in S1, a deep learning network is trained to obtain a deep learning network model. In the embodiment, ResNet18 is selected as the deep learning network, and a loss function for the deep learning network is constructed as follows:

$$\text{Loss} = \sum_{p_i \in Q} \|n_{pi} - \breve{n}_{pi}\|^2; \quad (15)$$

where $p_i$ is a point in the point cloud data; Q is a point set including all points in the deep learning training set; $n_{pi}$ is a normal of the point $p_i$ predicted by the deep learning network; and $\breve{n}_{pi}$ is a theoretical normal of the point $p_i$.

S22) The heightmap generated in S1 is inputted into the ResNet18 network. A weight of the ResNet18 network is updated using a stochastic gradient descent method and a backpropagation algorithm, in which an initial learning rate is 0.001, and a preset maximum number of iterative training is 200. The training is stopped until a network loss value area converges, thereby obtaining the deep learning network model.

S3) A real aircraft part is scanned via a laser scanner to obtain measured point cloud data. The normal information of the measured point cloud is predicted based on the deep learning network model trained in S2.

S31) A point $p_m$ in the measured point cloud data is given, and a local neighborhood of the point is constructed by using a recurrent neural network. Specifically, the neighborhood radius is 3 times the length of an average distance of the point cloud model.

S32) A covariance matrix $C_{pm}$ is calculated according to a formula (16) as follows:

$$C_{pm} = \frac{1}{|\Gamma|} \sum_{p_n \in \Gamma} (p_m - p_n)(p_m - p_n)^T; \quad (16)$$

where $p_m$ is the point in the measured point cloud data; $p_n$ is a point in the local neighborhood; $\Gamma$ is a local neighborhood of $p_m$; and $|\Gamma|$ is the number of points in the local neighborhood.

S33) Three eigenvalues and three eigenvectors of the covariance matrix $C_{pm}$ are defined as $\lambda'_1, \lambda'_2, \lambda'_3$ and $u'_1, u'_2, u'_3$, respectively, where $\lambda'_1 \geq \lambda'_2 \geq \lambda'_3$ and $u'_3 = (R', S', T')$.

S34) The vector $u'_3$ is taken as a normal vector of a projection plane, and the projection plane P' is constructed according to a formula (17) as follows:

$$R'(x'-x'_i) + S'(y'-y'_i) + T'(z'-z'_i) = 0 \quad (17);$$

where (x', y', z') is a coordinate of a point on the projection plane P'; and $(x_i, y_i, z_i)$ is a coordinate of $p_i$.

S35) Based on the constructed projection plane P', all points in the local neighborhood are projected to the projection plane P' along the vector $u'_3$ to obtain a heightmap of $p_m$.

S36) The heightmap generated in S35 is inputted into the deep learning network model obtained in S2 to obtain a normal vector of the point $p_m$.

S4) Based on the normal information predicted in S3, a position of each point in the measured point cloud data is further updated. The point update function is designed to obtain the updated point cloud, i.e., the point cloud model after denoising, thereby completing denoising of the measured point cloud data. Specifically, the position of each point in the measured point cloud data is updated according to a formula (18) as follows:

$$\tilde{P}_m = p_m + \alpha_m \sum_{p_n \in \Gamma} (p_m - p_n)(n_n^T n_n + n_m^T n_m); \quad (18)$$

where $p_m$ is a point in the measured point cloud data; $p_n$ is a point in the local neighborhood; $\alpha_m$ is a weight parameter, which controls a step length of the point update, and its specific value is $$\frac{1}{3|\Gamma|};$$

$\Gamma$ is a local neighborhood of the point $p_m$; $n_n$ is a normal vector of the point $p_n$; and $n_m$ is a normal vector of the point $p_m$.

Figure 4:
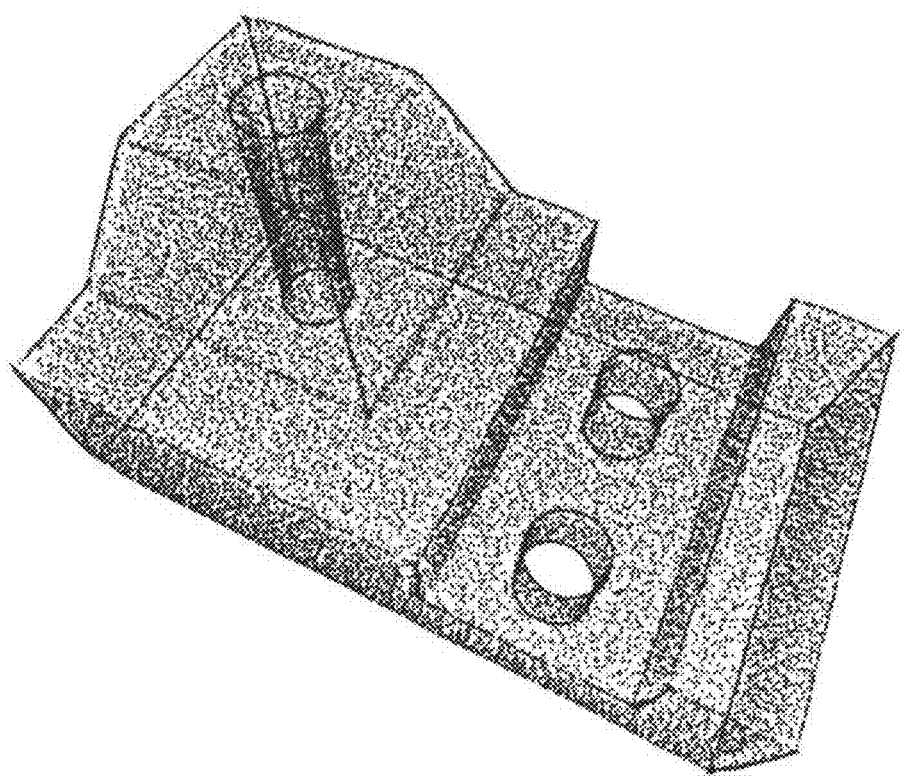
FIG. 4 shows a result of denoising the point cloud of the aircraft part according to an embodiment of the present disclosure.
Figure 5:
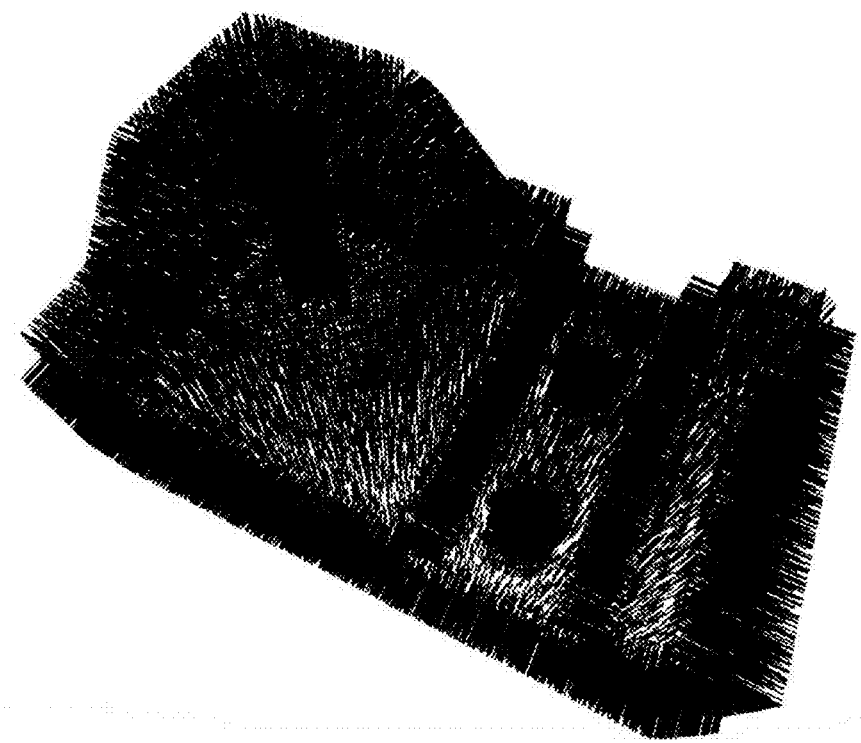
FIG. 5 shows a normal estimation result for the point cloud according to an embodiment of the present disclosure.

FIGS. 4-5 respectively show a point cloud model after the point update (i.e., a model after denoising) and a normal estimated by deep learning. Compared to FIG. 2, it can be seen that the noise problem of the point cloud data has been solved, while the features such as the component structure have not changed. Therefore, the method provided in the present disclosure can accurately complete a denoising processing of the measured point cloud data of the aircraft part, while retaining structural characteristics of the aircraft part, so that the problems of low accuracy and low efficiency in traditional detection methods are effectively solved, thereby ensuring efficiency and accuracy of subsequent detection and analysis for the structure of the aircraft part.

Described above is only a preferred embodiment of the present disclosure. It should be pointed out that, any modification and improvement made by those skilled in the art without departing from the spirit of the present disclosure shall fall within the scope of the appended claims.

What is claimed is:

1. A point cloud denoising method based on deep learning for an aircraft part, comprising:
   S1) based on a theoretical data model of the aircraft part, adding different degrees of Gaussian noise; generating a heightmap for each of points in the theoretical data model; and constructing a deep learning training set;
   S2) based on the deep learning training set constructed in S1, training a deep learning network to obtain a deep learning network model;
   S3) scanning a real aircraft part via a laser scanner to obtain measured point cloud data; and predicting normal information of the measured point cloud based on the deep learning network model trained in S2; and
   S4) based on the normal information predicted in S3, further updating a position of each of points in the measured point cloud data, thereby completing denoising of the measured point cloud data;
   wherein a process of generating the heightmap for each of points in the theoretical data model in S1 comprises:
   S11) presetting a point p in point cloud data from the theoretical data model;
   and constructing a local neighborhood of the point by using a recurrent neural network;
   S12) calculating a covariance matrix $C_{pi}$, according to a formula (1) as:

$$C_{pi} = \frac{1}{|\Psi|} \sum_{p_j \in \Psi} (p_i - p_j)(p_i - p_j)^T; \quad (1)$$

wherein $p_i$ is the point in the point cloud data; $p_i=(x, y, z)$; $(x_i, y_i, z_i)$ is a coordinate of the point $p_i$; $p_j$ is a point in the local neighborhood; T is the local neighborhood of the point $p_i$; and $|\Psi|$ is the number of points in the local neighborhood;

S13) defining three eigenvalues and three eigenvectors of the covariance matrix $C_{pi}$ as $\lambda_1, \lambda_2, \lambda_3$ and $\mu_1, \mu_2, \mu_3$, respectively, wherein $\lambda_1 \geq \lambda_2 \geq \lambda_3$, and $\mu=(R, S, T)$;

S14) taking the vector $u_3$ as a normal vector of a projection plane, and constructing the projection plane P according to a formula (2) as:

$$R(x-x_i)+S(y-y_i)+T(z-z_i)=0 \quad (2);$$

wherein (x, y, z) is a coordinate of a point on the projection plane P; and $(x_i, y_i, z_i)$ is the coordinate of the point $p_i$; and S15) based on the projection plane P constructed in S14, all points in the local neighborhood are projected to the projection plane P along the vector $\mu_3$ to obtain a heightmap of the point $p_i$;

wherein S3 further comprises:

S31) presetting a point $p_m$ in the measured point cloud data, and constructing a local neighborhood of the point by using a recurrent neural network;

S32) calculating a covariance matrix $C_{pm}$, according to a formula (4) as:

wherein $p_m$ is the point in the measured point cloud data: $p_n$ is a point in the local neighborhood: $\Gamma$ is a local neighborhood of $p_m$; and $|\Gamma|$ is the number of points in the local neighborhood;

S33) respectively defining three eigenvalues and three eigenvectors of the covariance matrix $C_{pm}$ as $\lambda'_1, \lambda'_2, \lambda'_3$ and $\mu'_1, \mu'_2, \mu'_3$, wherein $\lambda'_1 \geq \lambda'_2 \geq \lambda'_3$, and $\mu'_3=(R', S', T')$;

S34) taking the vector $\mu'$, as a normal vector of a projection plane, and constructing the projection plane P' according to a formula (2) as:

$$R'(x'-x'_i)+S'(y'-y'_i)+T'(z'-z'_i)=0 \quad (5)$$

wherein (x', y', z') is a coordinate of a point on the projection plane P'; and $(x_i, y_i, z_i)$ is a coordinate of $p_i$;

S35) based on the projection plane P' constructed in S34, projecting all points in the local neighborhood to the projection plane P' along the vector $\mu'$, to obtain a heightmap of $p_m$; and S36) inputting the heightmap generated in S35 into the deep learning network model obtained in S2, to obtain a normal vector of the point $p_m$; in S4, the position of each of the points in the measured point cloud data is updated according to a formula (6) as:

wherein $p_m$ is a point in the measured point cloud data; $p_n$ is a point in the local neighborhood: $\alpha_m$ is a weight parameter: $\Gamma$ is a local neighborhood of $p_m$; $n_n$ is a normal vector of $p_n$; and $n_m$ is a normal vector of $p_m$.

2. The point cloud denoising method of claim 1, wherein a process of training the deep learning network to obtain the deep learning network model comprises:

S21) selecting ResNet18 as a deep learning network, and constructing a loss function for the deep learning network as:

$$\text{Loss} = \sum_{p_i \in Q} \left\| n_{pi} - \bar{n}_{pi} \right\|^2; \quad (3)$$

wherein $p_i$ is a point in the pint cloud data; Q is a point set comprising all points in the deep learning training set; $n_{pi}$ is a normal of the point $p_i$ predicted by the deep learning network; and $\bar{n}_{pi}$ is a theoretical normal of the point $p_i$; and S22) inputting the heightmap generated in S1 into the ResNet18 network; updating a weight of the ResNet18 network using a stochastic gradient descent method and a backpropagation algorithm; stopping training until a network loss value area converges, thereby obtaining the deep learning network model.

3. The point cloud denoising method of claim 2, wherein in S22, an initial learning rate is 0.001, and a preset maximum number of iterative training is 200.

* * * * *